(12) United States Patent
Grosskopf et al.

(10) Patent No.: US 8,963,391 B2
(45) Date of Patent: Feb. 24, 2015

(54) DECOUPLER SHAFT FOR HIGH SPEED GENERATOR

(75) Inventors: Andrew P. Grosskopf, Rockford, IL (US); Glenn C. Lemmers, Jr., Loves Park, IL (US); Joseph Kenneth Coldwate, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1282 days.

(21) Appl. No.: 12/436,159

(22) Filed: May 6, 2009

(65) Prior Publication Data

US 2010/0283341 A1 Nov. 11, 2010

(51) Int. Cl.
| | | |
|---|---|---|
| *H02K 7/10* | (2006.01) | |
| *H02K 7/108* | (2006.01) | |
| *F01D 5/02* | (2006.01) | |
| *F01D 15/10* | (2006.01) | |
| *F02C 7/36* | (2006.01) | |
| *F16D 11/04* | (2006.01) | |
| *F16D 11/00* | (2006.01) | |

(52) U.S. Cl.
CPC ............... *H02K 7/108* (2013.01); *F01D 5/026* (2013.01); *F01D 15/10* (2013.01); *F02C 7/36* (2013.01); *F16D 11/04* (2013.01); *F16D 2011/008* (2013.01)
USPC ............................................ 310/78; 310/100

(58) Field of Classification Search
CPC ........ H02K 7/10; H02K 7/108; H02K 7/1125
USPC ........... 310/76, 78, 92, 96, 100; 192/34, 69.2, 192/89.21
See application file for complete search history.

(56) References Cited

U.S. PATENT DOCUMENTS

| | | | | |
|---|---|---|---|---|
| 2,642,970 | A | * | 6/1953 | Szekely ....................... 192/69.2 |
| 3,441,116 | A | * | 4/1969 | Quenneville ................. 192/69.2 |
| 4,042,088 | A | * | 8/1977 | Schmohe ................... 192/89.21 |
| 4,244,455 | A | * | 1/1981 | Loker ............................. 192/24 |
| 4,545,470 | A | | 10/1985 | Grimm |
| 4,934,977 | A | * | 6/1990 | Falconer et al. ............. 192/82 T |
| 4,997,072 | A | | 3/1991 | Lapthorne |
| 5,023,789 | A | | 6/1991 | Lampe et al. |
| 5,029,689 | A | | 7/1991 | Grimm |
| 5,031,740 | A | * | 7/1991 | Deichstetter et al. ........ 192/69.2 |
| 5,103,949 | A | * | 4/1992 | Vanderzyden et al. ......... 192/24 |
| 5,174,109 | A | | 12/1992 | Lampe |
| 5,325,009 | A | | 6/1994 | Capion et al. |
| 5,538,089 | A | * | 7/1996 | Sanford ..................... 192/89.21 |
| 5,562,190 | A | | 10/1996 | McArthur |
| 6,897,581 | B2 | | 5/2005 | Doherty et al. |
| 7,084,522 | B2 | | 8/2006 | Wobben |
| 7,131,275 | B2 | | 11/2006 | Gustafson |

\* cited by examiner

*Primary Examiner* — Michael Andrews

(74) *Attorney, Agent, or Firm* — Carlson, Gaskey & Olds, PC

(57) ABSTRACT

A clutch member for use in a generator clutch has actuation structure including a face with a ramp. The ramp has a ramp angle of between 6.2° and 6.4°. The clutch member may be a sliding decoupler shaft. In addition, a rotor and a generator including the clutch members are also disclosed and claimed.

18 Claims, 3 Drawing Sheets

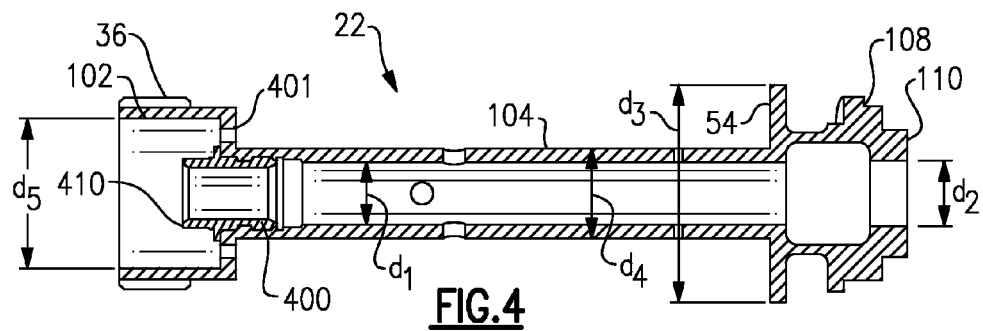
FIG.4
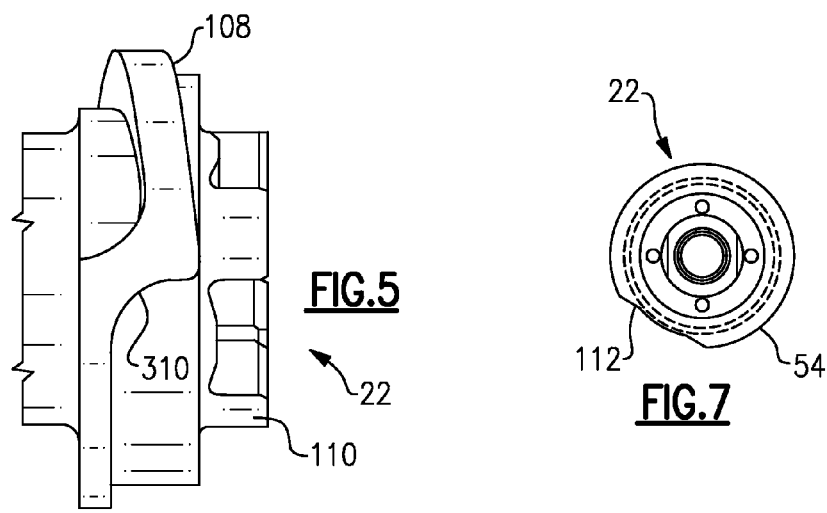
FIG.5
FIG.7
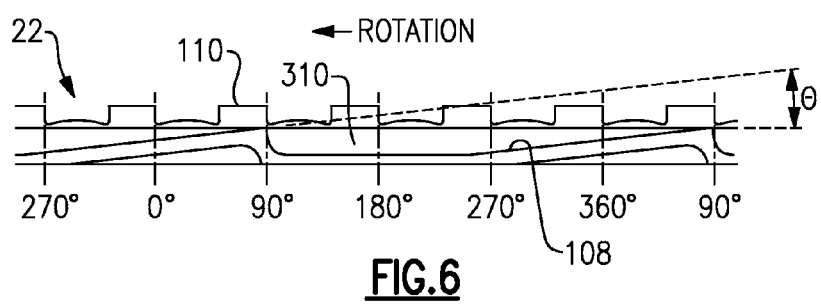
FIG.6

DECOUPLER SHAFT FOR HIGH SPEED GENERATOR

BACKGROUND OF THE INVENTION

This application relates to a decoupler shaft and actuation yoke for use in selectively connecting an input shaft to a generator rotor shaft.

Generators as are typically utilized to generate electricity, include an input shaft that receives a source of rotation. As an example, gas turbine engines have a shaft, which drive the input shaft through a gear train. At times, it is undesirable for the generator to be driven to rotate. Thus, a clutch is provided to selectively connect the generator rotor shaft to the input shaft. The clutch typically includes a sliding toothed clutch member which is slid along an axis of rotation between engaged and disengaged positions.

In one known type of generator, the sliding clutch member includes a ramped face that interfaces with a ramp face on a yoke. The two faces are brought into contact with each other, and the yoke cams the sliding clutch member away from the input shaft such that teeth which are in engagement are moved out of engagement, and the sliding clutch member, and hence the generator rotor shaft is no longer driven.

In the existing clutch members, the angle of this ramp is undesirably large for applications that require decoupling capability at high-speeds. As an example, the lead or ramp angle has typically been 7°. The lead angle determines the rate at which the shaft can move axially. This relatively large lead angle results in high forces reacting at the engaging ramp and yoke faces when the decoupling event occurs at high shaft speeds.

SUMMARY OF THE INVENTION

A clutch member for use in a generator clutch has actuation structure including a face with a ramp. The ramp has a ramp angle of between 6.2° and 6.4°. The actuation yoke that engages the ramp has a complementary angled face. The clutch member may be a sliding decoupler shaft.

A rotor assembly for a generator includes a rotor shaft receiving a winding section. The rotor shaft receives a sliding clutch member in an internal bore. The clutch member and the rotor shaft each have splines for sliding movement of the clutch shaft within the rotor shaft. The clutch member has a first end provided with the splines, and a second end having actuation structure including teeth to mesh with teeth on an opposed jaw clutch. The spring that biases the jaw clutch into engagement is nested within the interior of the spline of sliding clutch member. The actuation structure further including a face with a ramp to receive an actuation yoke. The ramp has a ramp angle of between 6.2 and 6.4°.

A generator includes a stator surrounding a rotor shaft, said rotor shaft receiving a winding section. The rotor shaft further receives a sliding clutch member in an internal bore. The clutch member and the rotor shaft each have splines for sliding movement of the clutch member within the rotor shaft. The clutch shaft has a first end provided with the splines, and a second end having actuation structure including teeth to mesh with teeth on an opposed jaw clutch. The spring that biases the jaw clutch into engagement is nested within the interior of the spline of sliding clutch member. The actuation structure further includes a face with a ramp to receive an actuation yoke. The ramp has a ramp angle of between 6.2 and 6.4°.

These and other features of the present invention can be best understood from the following specification and drawings, the following of which is a brief description.

BRIEF DESCRIPTION OF THE DRAWINGS

FIG. 4 is a cross-sectional view through a sliding clutch member.

FIG. 5 is a detailed view of an actuation portion of the FIG. 4 sliding clutch member.

FIG. 6 shows a helical ramp angle through a circumferential distance of the FIG. 4 sliding clutch member.

FIG. 7 is an end view of the FIG. 4 sliding clutch member.

DETAILED DESCRIPTION OF THE PREFERRED EMBODIMENT

Figure 1:
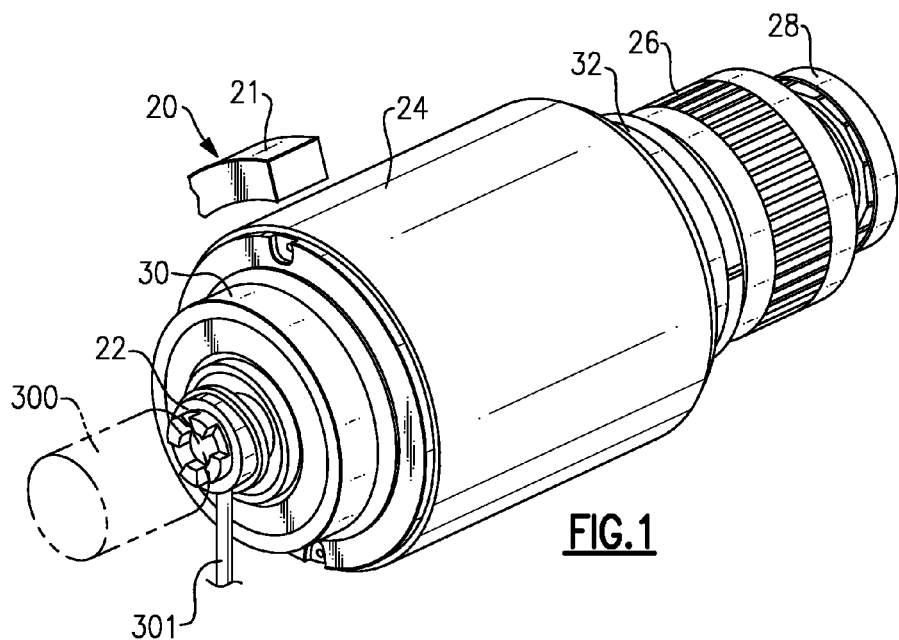
FIG. 1 is a drawing showing a generator.

FIG. 1 shows a generator 20 including a stator 21, shown schematically. A clutch member 22 has teeth that will selectively engage teeth on an input shaft 300. The clutch member 22 may also be moved to engage or disengage from the input shaft 300.

A main winding portion 24 rotates near the stator 21. An exciter rotor 26 and a permanent magnet rotor 28 provide control and safety functions, and also are associated with their own stators (not shown). Bearings 30 and 32 are placed on opposed axial ends of the main winding section 24.

Drive input 300 is shown in phantom in FIG. 1 and a yoke 301 is shown schematically. The yoke 301 engages the cam surfaces on the clutch member 22 and is axially translated away from the input shaft 300 such that drive can be selectively decoupled.

Aspects of the teeth in the clutch members are found in co-pending patent application Ser. No. 12/436,168, filed on even date herewith, and entitled "High Speed Clutch Design with Jaw Tooth Profile to Reduce Separating Load."

Figure 2:
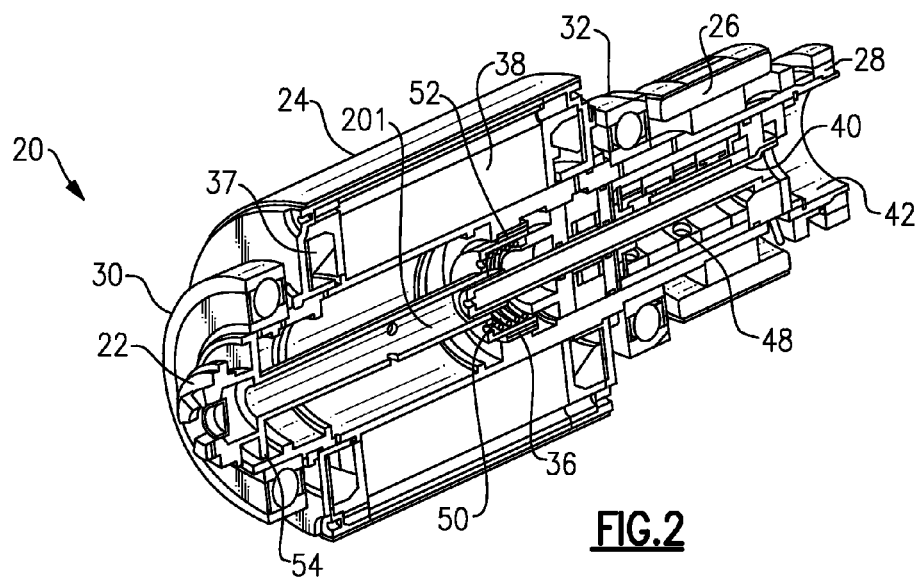
FIG. 2 is a cross-sectional view of the generator.

As shown in FIG. 2, generator 20 includes the bearings 30 and 32 mounted at each end of the main winding section 24. Windings 37 and laminations 38 are received within this main winding section 24.

An enlarged portion 54 of the clutch member 22 is a close fit within an inner diameter of a rotor shaft 42. The opposite end of the sliding clutch member 22 is supported at its spline 36 by the interior spline 52 of the rotor shaft 42. Rectifier assembly 48 is shown schematically, and is positioned within a bore in the rotor shaft 42.

Splines 52 are formed at an axially intermediate portion of the inner bore of the shaft 42, and mate with splines 36 on the clutch member 22. A spring 50 biases the clutch member 22 outwardly, and against the input shaft 300. Spring 50 is contained within the inner diameter of end 102 of clutch member 22, nested within the interior of its spline 36 offering significant packaging advantages. Further details of the operation of the generator 20 may be better understood from co-pending patent application Ser. No. 12/436,161, filed on even date herewith, and entitled "Generator Rotor with Improved Hollow Shaft," and owned by the Assignee of this application.

Figure 3:
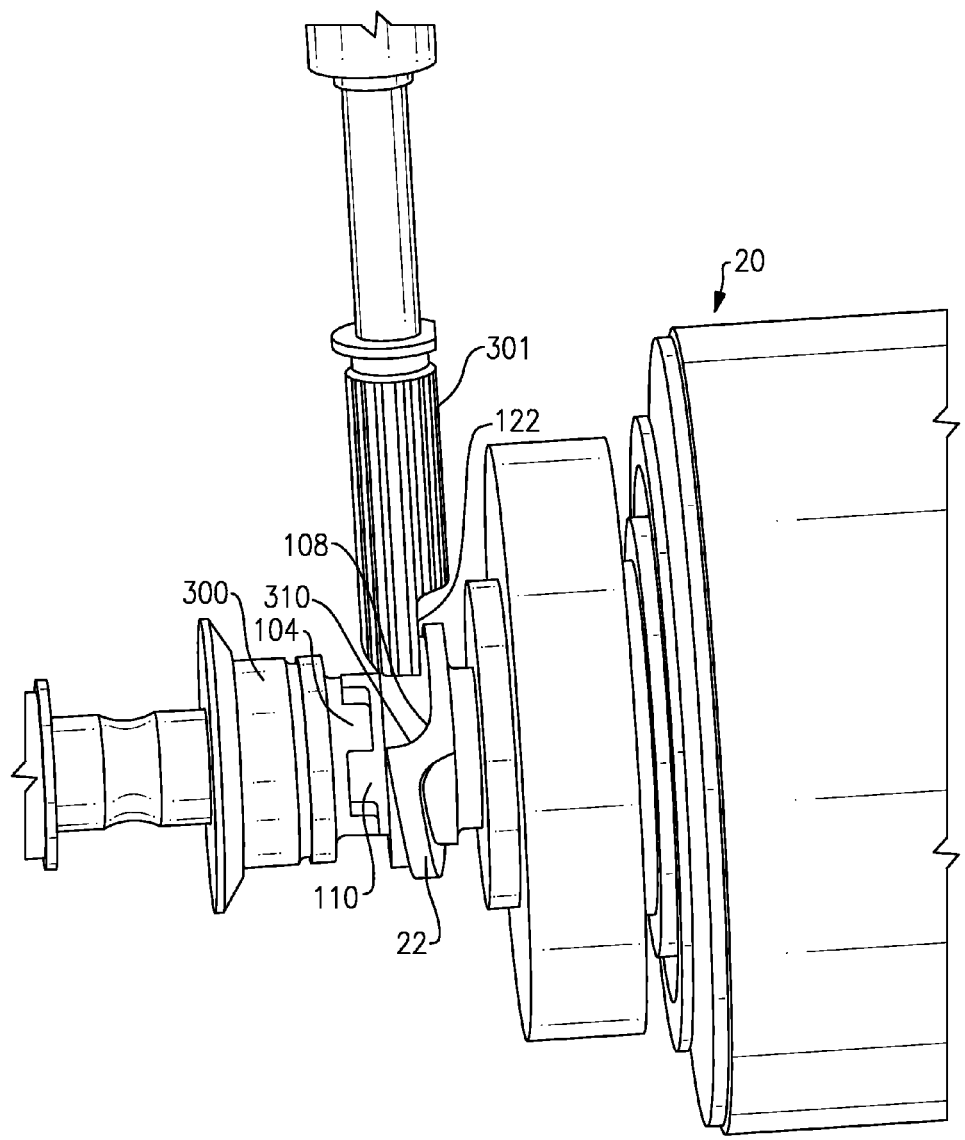
FIG. 3 is a detailed view of a portion of a clutch incorporated into the generator.

FIG. 3 shows the sliding clutch member 22 having a ramp 108 with an open area 310 into which the yoke 301 will initially move. Teeth 110 on the clutch member 22, and teeth 104 on mating input shaft 300 interfit to drive rotation from the input shaft 300 through the sliding clutch member 22. When it is desired that there not be rotation of the clutch member 22, or operation of the generator 20, then the yoke 301 is moved into the position illustrated in FIG. 3, and is driven along the ramped surface 108, with its mating ramp surface 122. It should be understood the ramp surfaces 108 and 122 are formed to have complementary ramp angles.

As shown in FIG. 4, the clutch member 22 incorporates a central shaft 104 extending between an enlarged end 102 with splines 36, a forward portion 54 which is received within an inner peripheral surface of the rotor shaft 42 (see FIG. 2), the ramp 108, and the jaw clutch teeth 110. As shown in FIG. 5, the ramp 108 includes an enlarged area 310 into which the yoke will move. The teeth 110 are also shown.

As further shown in FIG. 4, an inner diameter within the teeth is d2. An inner diameter of the central portion 104 is d1 and the outer diameter of the central portion 104 is d4. An outer diameter of the portion 54 is d3. An inner diameter of end 102 is d5. In one embodiment, d1 was 0.545" (13.8 mm), d2 was 0.567" (14.4 mm), d3 was 1.919" (48.74 mm), d4 was 0.745" (18.9 mm), and d5 was 1.290" (32.8 mm). A ratio of d1 to d2 is between 0.92 and 1.00, a ratio of d2 to d3 is between 0.29 and 0.30, a ratio of d1 to d4 is between 0.70 and 0.76, and a ratio of d1 to d5 is between 0.40 and 0.44.

Further, as is clear from FIG. 4, an oil dam/labyrinth seal 400 is mounted within a radially outwardly extending ledge 401, extending radially outwardly from central shaft 104, and connecting into the end 102 that receives the spline 36. As shown, an axially leftmost end 410 of oil dam/labyrinth seal 400 extends axially beyond the ledge 401. Returning to FIG. 2, an oil tube 40 is shown extending into the oil dam/labyrinth seal 400. This oil tube will supply oil to the interior of the clutch member 22.

FIG. 6 shows the ramp angle is an angle θ in this application, and shows the circumferential rollout view of in this ramp across a number of degrees. It also shows the open area 310 into which the yoke will move during engagement. In one embodiment, the angle θ was 6.3°. In preferred embodiments of this invention, θ can be between 6.2 and 6.4°. The yoke has a mating ramp angle that will correspond with θ.

FIG. 7 is an end view of a portion of the sliding clutch member 22 and shows an enlarged portion 54 and a truncated surface 112. The truncated surface is at a tangent relative to a centerline of clutch member 22, and extends over approximately 67°. Stated another way, the truncated surface 112 is formed at a secant relative to the enlarged portion. A radius to the truncated surface was 0.800" (20.3 mm) in one embodiment providing an effective 1.600" (40.6 mm) diameter, compared to an overall diameter of 1.919" (48.74 mm) for the enlarged portion 54. Preferably the ratio of the diameter to the truncated portion to the overall diameter of the enlarged portion is between 0.80 and 0.85. The relative location of the truncated surface 112 to the ramp 108 serves as a lightweight angular zone to account for the geometry of ramp 108 of sliding clutch member 22 for rotating balance purposes. The cut-out for the truncated surface 112 also serves as an oil flow orifice which prevents hydraulic lock (trapped volume) between the sliding clutch member 22 and the rotor shaft 42 during the decoupling event.

With the inventive face between the yoke and the sliding decoupler shaft, lower forces are required to accelerate the shaft. Thus, higher rotational speed capability is provided to the overall clutch, and hence the generator.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A clutch member for use in a generator clutch comprising:
    actuation structure including a face with a ramp;
    the ramp having a ramp angle of between 6.2° and 6.4°;
    said clutch member is a sliding decoupler shaft having a first end provided with splines to slide along a generator rotor shaft, a second end having said actuation structure, and including teeth to mesh with teeth on an opposed jaw clutch;
    an enlarged portion on said shaft is inward of said ramp from said second end, said enlarged portion having a diameter which is greater than an outer diameter of said ramp; and
    said enlarged portion has a truncated portion, with said truncated portion formed at a secant to a remainder of the enlarged portions at locations not having said truncated portion, and a ratio of a radius to said truncated portion to a radius of said enlarged portion at locations not having said truncated portion being between 0.80 and 0.85.

2. The clutch member as set forth in claim 1, wherein said clutch member includes a spring that normally biases the clutch member into engagement, said spring being within a bore in said clutch member.

3. The clutch member as set forth in claim 1, wherein said first end of said shaft is formed to have a greater diameter than a central portion of said shaft which connects said first end of said shaft to said actuation structure of said shaft, and there being a ledge connecting said first end and said central portion.

4. The clutch member as set forth in claim 1, wherein an oil dam is mounted within said central portion, and extends axially from said central portion of said shaft and beyond said ledge.

5. The clutch member as set forth in claim 1, wherein an inner diameter of said actuation structure of said shaft has a diameter, and a diameter of said central portion of said shaft being of a smaller diameter with a ratio of inner/outer diameters of the center portion of said shaft being between 0.70 and 0.76, and wherein a ratio of said diameter of said actuation structure of said shaft to said diameter of said central portion of said shaft being between 0.92 and 1.00.

6. The clutch member as set forth in claim 1, wherein ends of said secant are spaced by 67° about a center axis of said shaft.

7. A rotor for a generator comprising:
    a rotor shaft, said rotor shaft receiving a winding section, and said rotor shaft further receiving a sliding clutch shaft in an internal bore, said clutch shaft and rotor shaft each having splines which guide the clutch shaft for sliding movement within said rotor shaft;
    said clutch shaft having a first end provided with said splines, and a second end having actuation structure including teeth to mesh with teeth on an opposed jaw clutch, said actuation structure further including a face with a ramp to receive an actuation yoke, and said ramp having a ramp angle of between 6.2 and 6.4°
    an enlarged portion on said shaft is inward of said ramp from said second end, said enlarged portion having a diameter which is greater than an outer diameter of said ramp; and
    said enlarged portion has a truncated portion, with said truncated portion formed at a secant to a remainder of the enlarged portions at locations not having said truncated portion, and a ratio of a radius to said truncated portion to a radius of said enlarged portion at locations not having said truncated portion being between 0.80 and 0.85.

8. The rotor as set forth in claim 7, wherein said first end of said clutch shaft is formed to have a greater diameter than a central portion of said shaft which connects said first end of said shaft to said actuation structure of said shaft, and there being a ledge connecting said first end and said central portion.

9. The rotor as set forth in claim 8, wherein an oil dam is mounted within said central portion of said shaft, and extends axially from said central portion of said shaft and beyond said ledge.

10. The rotor as set forth in claim 9, wherein an oil tube is supported within said oil dam at one end, and is fixed at another end to structure which in turn connects to said rotor shaft.

11. The rotor as set forth in claim 8, wherein an inner diameter of said actuation structure of said shaft has a diameter, and a diameter of said central portion of said shaft being of a smaller diameter, and wherein a ratio of said diameter of said actuation structure of said shaft to said diameter of said central portion of said shaft being between 0.92 and 1.00.

12. The rotor as set forth in claim 7, wherein ends of said secant are spaced by 67° about a center axis of said shaft.

13. A generator comprising:
a stator surrounding a rotor shaft, said rotor shaft receiving a winding section, and said rotor shaft further receiving a sliding clutch shaft in an internal bore, said clutch shaft and rotor shaft each having splines which guide the clutch shaft for sliding movement within said rotor shaft;
said clutch shaft having a first end provided with said splines, and a second end having actuation structure including teeth to mesh with teeth on an opposed jaw clutch, said actuation structure further including a face with a ramp to receive an actuation yoke, and said ramp having a ramp angle of between 6.2 and 6.4°;
an enlarged portion on said shaft is inward of said ramp from said second end, said enlarged portion having a diameter which is greater than an outer diameter of said ramp; and
said enlarged portion has a truncated portion, with said truncated portion formed at a secant to a remainder of the enlarged portions at locations not having said truncated portion, and a ratio of a radius to said truncated portion to a radius of said enlarged portion at locations not having said truncated portion being between 0.80 and 0.85.

14. The generator as set forth in claim 13, wherein said first end of said clutch shaft is formed to have a greater diameter than a central portion of said shaft which connects said first end of said shaft to said actuation structure of said shaft, and there being a ledge connecting said first end and said central portion.

15. The generator as set forth in claim 14, wherein an oil dam is mounted within said central portion of said shaft, and extends axially from said central portion of said shaft and beyond said ledge.

16. The generator as set forth in claim 15, wherein an oil tube is supported within said oil dam at one end, and is fixed at another end to structure which in turn connects to said rotor shaft.

17. The generator as set forth in claim 15, wherein an inner diameter of said actuation structure of said shaft has a diameter, and a diameter of said central portion of said shaft being of a smaller diameter, and wherein a ratio of said diameter of said actuation structure of said shaft to said diameter of said central portion of said shaft being between 0.92 and 1.00.

18. The generator as set forth in claim 13, wherein ends of said secant are spaced by 67° about a center axis of said shaft.

\* \* \* \* \*